United States Patent
Sato et al.

(10) Patent No.: US 8,643,594 B2
(45) Date of Patent: Feb. 4, 2014

(54) DISPLAY DEVICE

(75) Inventors: Hideo Sato, Hitachi (JP); Shigeyuki Nishitani, Mobara (JP); Takayuki Nakao, Atsugi (JP); Naruhiko Kasai, Yokohama (JP); Hajime Akimoto, Kokubunji (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 13/438,043

(22) Filed: Apr. 3, 2012

(65) Prior Publication Data

US 2012/0249483 A1 Oct. 4, 2012

Related U.S. Application Data

(63) Continuation of application No. 11/526,749, filed on Sep. 26, 2006, now Pat. No. 8,184,090.

(30) Foreign Application Priority Data

Sep. 28, 2005 (JP) .................................. 2005-281061

(51) Int. Cl.
*G09G 3/36* (2006.01)

(52) U.S. Cl.
USPC ......................................................... 345/104

(58) Field of Classification Search
USPC .................. 345/104, 207, 173, 175–176, 697
See application file for complete search history.

(56) References Cited

U.S. PATENT DOCUMENTS

| 5,414,375 | A | 5/1995 | Tsuboi |
| 5,673,063 | A * | 9/1997 | Weisbrod ...................... 345/100 |
| 5,808,496 | A * | 9/1998 | Thiel .............................. 327/210 |
| 7,525,523 | B2 | 4/2009 | Yamazaki et al. |
| 2003/0076295 | A1* | 4/2003 | Nakajima ..................... 345/156 |
| 2005/0062708 | A1 | 3/2005 | Yoshihara et al. |
| 2005/0140632 | A1 | 6/2005 | Tsuda et al. |
| 2005/0200293 | A1 | 9/2005 | Naugler et al. |
| 2005/0275616 | A1* | 12/2005 | Park et al. ..................... 345/102 |
| 2005/0280713 | A1* | 12/2005 | Hagihara et al. ......... 348/207.99 |

FOREIGN PATENT DOCUMENTS

| EP | 1610210 | 12/2005 |
| JP | 2003-131798 | 5/2003 |
| JP | 2004-318819 | 11/2004 |

* cited by examiner

*Primary Examiner* — William Boddie
*Assistant Examiner* — Towfiq Elahi
(74) *Attorney, Agent, or Firm* — Antonelli, Terry, Stout & Kraus, LLP.

(57) ABSTRACT

A display device with a touch pad function is provided which reduces the elements required to form a photo sensor while still accurately detecting input coordinate positions. The display device includes a display part on which a plurality of pixels are arranged in a matrix array, a plurality of photo detection circuits which are arranged in a matrix array in the inside of the display part, wherein each photo detection circuit of the plurality of photo detection circuits includes: a photo sensor which converts an incident light into a optical current corresponding to intensity of the incident light, an integral capacitance which integrates the optical current converted by the photo sensor, and a comparator to which a voltage of the integral capacitance is inputted, and the comparator includes a transistor of an open drain output type with a grounded source.

12 Claims, 10 Drawing Sheets

| V[pps] | N | F[kHz] |
|---|---|---|
| 50 | 1 | 19.2 |
| | 2 | 38.4 |
| | 4 | 76.8 |
| | 8 | 153.6 |
| | 16 | 307.2 |
| 200 | 1 | 76.8 |
| | 2 | 153.6 |
| | 4 | 307.2 |
| | 8 | 614.4 |
| | 16 | 1,228.8 |

| | t=Ti | t=2Ti | t=3Ti |
|---|---|---|---|
| $Ip0 < Ip$ | L | × | × |
| $Ip0/2 < Ip \leq Ip0$ | H | L | × |
| $Ip0/3 < Ip \leq Ip0/2$ | H | H | L |
| $Ip \leq Ip0/3$ | H | H | H |

DISPLAY DEVICE

CROSS-REFERENCE TO RELATED APPLICATIONS

This application is a continuation application of U.S. application Ser. No. 11/526,749, filed Sep. 26, 2006 now U.S. Pat. No. 8,184,090, and the disclosure of Japanese Patent Application No. P2005-281061 filed on 2005 Sep. 29 (yyyy/mm/dd) including the claims, the specification, the drawings and the abstract are incorporated herein by reference in its entirety.

BACKGROUND

1. Field of the Invention

The present invention relates to a display device, and more particularly to a display device which includes a touch panel function.

2. Description of Related Art

As a display device which includes a coordinates inputting device, there has been known a display device which includes a touch panel.

The conventional touch panel is mainly of a resistance film type and adopts the structure which mounts the touch panel on the display panel. Accordingly, the conventional touch panel has drawbacks such that the visibility is deteriorated due to the increase of surface reflection, a mechanism which mounts the touch panel on the display becomes necessary, and a means which calibrates an output of the touch panel and a position of a display becomes necessary.

To overcome these drawbacks, a display device which incorporates a touch panel function in a display part is disclosed in, for example, following published or unpublished patent documents 1 and 2.

In the display device disclosed in patent document 1, the photo detection means is constituted of a photo sensor, a buffer TFT, an output selection TFT, and a reset TFT.

In the display device disclosed in patent document 1, initializing and reading of the photo sensor are performed in synchronism with a gate scanning signal supplied to a display part, and two-dimensional image data is outputted.

In the display device disclosed in patent document 2, a photo detection means is constituted of a photo sensor, a holding capacitance, an initializing means, and a latch means.

In the display device disclosed in patent document 2, light which is radiated to the photo sensor is binarized and is held by the latch means. The binarized signal is outputted from a signal line and is taken out as a two-dimensional image. The display device detects a change of image data when a finger approaches and is brought into contact with a display part and specifies a coordinate position.

Here, as prior art documents relevant to the present invention, following documents are named.
[Patent document 1] US2003076295A
[Patent document 2] EP1610210A

SUMMARY

In the display device disclosed in patent document 1, a signal of the photo sensor is outputted through a buffer amplifier and hence, a circuit scale is increased and a numerical aperture of a display part is lowered. Further, it is necessary to provide a means which binarizes an analog voltage on a peripheral circuit and hence, a transistor having a high function becomes necessary.

Further, in applying this method to a touch panel, a coordinate arithmetic means which specify coordinates of light radiation based on the detected two-dimensional image becomes necessary.

In the display device disclosed in patent document 2, the photo sensor means includes a latch circuit and hence, a circuit scale is increased and a numerical aperture of a display part is lowered. Further, a coordinate arithmetic means which specifies coordinates of light irradiation based on the binarized two-dimensional image becomes necessary.

One inventor of the five inventors of the present patent application, Akimoto, invented other inventions. The same assignee as this application filed an application including the other inventions as Ser. No. 11/094,757 to USPTO.

In the display device disclosed in Ser. No. 11/094,757, photo detection means are arranged in a matrix array, each photo detection means is constituted of a photo sensor and an output thin film transistor in the X, Y directions (hereinafter referred to as TFT), and the respective output TFTs in the X, Y direction of the photo detection means which are arranged in a matrix array are connected to each other in series.

In the display device disclosed in Ser. No. 11/094,757, the output TFT of each photo detection means takes ON/OFF states in response to an output level of the photo sensor. For example, assuming that the output TFT of each photo detection means is turned off upon radiation of light and is turned on with no-radiation of light, when any one of the photo detection means which are connected in series is radiated with light, the output TFT of the photo detection means assumes an OFF state, while when all photo detection means are not radiated with light, the output TFTs of all of photo detection means assume an ON state. Coordinates of light irradiation is detected by such operations.

The display device disclosed in Ser. No. 11/094,757 requires, to perform an ON/OFF control of the output TFTs in the X, Y directions which are connected in series, the photo sensors of a high-voltage output and, at the same time, the TFTs having an extremely high ON/OFF ratio.

The present invention has been made to overcome the above-mentioned drawbacks of the related arts, and it is an object of the present invention to provide a technique which, in a display device which incorporates a touch panel function therein, can reduce the number of components which constitutes a photo sensor circuit, and can detect an accurate input coordinates position without requiring a particular coordinate arithmetic circuit.

The above-mentioned and other objects and noble features of the present invention will become apparent from the description of this specification and attached drawings.

To briefly explain the summary of the typical inventions among inventions disclosed in this specification, they are as follows.

(1) In a display device which includes a display part on which a plurality of pixels are arranged in a matrix array, and a plurality of photo detection circuits which are arranged in a matrix array in the inside of the display part, each photo detection circuit of the plurality of photo detection circuits includes a photo sensor which converts an incident light into a optical current corresponding to intensity of the incident light, an integral capacitance which integrates the optical current converted by the photo sensor, and a comparator to which a voltage of the integral capacitance is inputted, and the comparator includes a transistor of an open drain output type with a grounded source.

(2) In the constitution (1), an initializing voltage which initializes the integral capacitance is applied to the integral capacitance via a reset line, an output of the comparator includes X output lines, an X output circuit which is connected to Y output lines which intersect the X output lines and to which the respective X output lines are connected, and a Y output circuit to which the respective Y output lines are connected, and the X output circuit and the Y output circuit are arranged around the display part.

(3) In a display device which includes a display part on which a plurality of pixels are arranged in a matrix array, and a plurality of photo detection circuits which are arranged in a matrix array in the inside of the display part, the display part includes a plurality of X output lines and a plurality of Y output lines which intersect the plurality of X output lines, each photo detection circuit of the plurality of photo detection circuits includes:

a photo sensor which converts an incident light into an optical current corresponding to intensity of the incident light;

an integral capacitance which is connected to one end of the photo sensor and integrates the optical current which is converted by the photo sensor, a first transistor which has a control electrode thereof connected to a node between the photo sensor and the integrated capacitance, a first electrode thereof connected to one of the plurality of X output lines, and allows a predetermined first voltage to be applied to a second electrode thereof, and a second transistor which has a control electrode thereof connected to a node between the photo sensor and the integrated capacitance, a first electrode thereof connected to one of the plurality of Y output lines, and allows a predetermined second voltage to be applied to a second electrode thereof.

(4) In the constitution (3), the display device includes an X output circuit to which the respective X output lines of the plurality of X output lines are connected and the Y output circuit to which the respective Y output line of the plurality of Y output lines are connected, and the X output circuit and the Y output circuit respectively have an initializing circuit which applies an initializing voltage for initializing the respective X output lines and the respective Y output lines to the respective X output lines and the respective Y output lines at an initial stage of a detection period for detecting the photo detection circuit to which light is radiated out of the plurality of photo detection circuits.

(5) In a display device which includes a display part on which a plurality of pixels are arranged in a matrix array, and a plurality of photo detection circuits which are arranged in a matrix array in the inside of the display part, the display part includes a plurality of X output lines and a plurality of Y output lines which intersect the plurality of X output lines, each photo detection circuit of the plurality of photo detection circuits includes:

a photo sensor which converts an incident light into an optical current corresponding to intensity of the incident light;

an integral capacitance which is connected to one end of the photo sensor and integrates the optical current which is converted by the photo sensor, and a transistor which has a control electrode thereof connected to a node between the photo sensor and the integrated capacitance and, at the same time, a first electrode thereof connected to one of the plurality of X output lines, and a second electrode thereof connected to one of the plurality of Y output lines.

(6) In the constitution (5), the display device includes an X output circuit to which the respective X output lines of the plurality of X output lines are connected and the Y output circuit to which the respective Y output lines of the plurality of Y output lines are connected, the Y output circuit includes a first voltage applying circuit which applies a predetermined first voltage to the respective Y output lines during a first detection period for detecting a position in the X direction of the photo detection circuit to which light is radiated out of the plurality of photo detection circuits, the X output circuit includes a first initializing circuit which applies a first initializing voltage for initializing the respective X output lines to the respective X output lines at an initial stage of the first detection period, the X output circuit includes a second voltage applying circuit which applies a predetermined second voltage to the respective X output lines during a second detection period for detecting a position in the Y direction of the photo detection circuit to which light is radiated out of the plurality of photo detection circuits, and the Y output circuit includes a second initializing circuit which applies a second initializing voltage for initializing the respective Y output lines to the respective Y output lines at an initial stage of the second detection period.

(7) In any one of the constitutions (3) to (6), the display device includes a reset line which is connected to another end of the photo sensor, and an integrated capacitance initializing voltage which initializes the integrated capacitance is applied to the reset line in an initial stage of a detection period for detecting a photo detection circuit to which light is radiated out of the plurality of photo detection circuits.

(8) In any one of the constitutions (2), (4) and (6), the X output circuit and the Y output circuit detect the optical currents in multiple gray scales by performing the detection of voltages of the X output lines and the Y output lines plural times during one detection period for detecting the photo detection circuit to which light is radiated out of the plurality of photo detection circuits.

(9) In a display device which includes a display part on which a plurality of pixels are arranged in a matrix array, a plurality of scanning lines which sequentially apply a scanning voltage to the plurality of pixels, and a plurality of photo detection circuits which are arranged in a matrix array in the inside of the display part, the display part includes a plurality of X output lines, each photo detection circuit out of the plurality of photo detection circuits includes:

a photo sensor which has one end thereof connected to the scanning lines of a next stage out of the plurality of scanning lines and converts an incident light into an optical current corresponding to intensity of the incident light;

an integrated capacitance which has one end thereof connected to another end of the photo sensor and integrates the optical current which is converted by the photo sensor, a first transistor which is connected between the own-stage scanning line out of the plurality of scanning lines and another end of the integrated capacitance, and has a control electrode thereof connected to a node between the photo sensor and the integrated capacitance, and a second transistor which has a control electrode thereof connected to the own-stage scanning line and, at the same time, a first electrode thereof connected to another end of the integrated capacitance, and a second electrode thereof connected to one of the plurality of X output lines.

(10) In a display device which includes a display part on which a plurality of pixels are arranged in a matrix array, a plurality of scanning lines which sequentially apply a scanning voltage to the plurality of pixels, and a plurality of photo detection circuits which are arranged in a matrix array in the inside of the display part, the display part includes a plurality of X output lines and a plurality of initializing control lines, each photo detection circuit out of the plurality of photo detection circuits includes:

a photo sensor which has one end thereof connected to one out of the plurality of initializing control lines and converts an incident light into an optical current corresponding to intensity of the incident light;

an integrated capacitance which has one end thereof connected to another end of the photo sensor and integrates the optical current which is converted by the photo sensor, a first transistor which is connected between the own-stage scanning line out of the plurality of scanning lines and another end of the integrated capacitance, and has a control electrode thereof connected to a node between the photo sensor and the integrated capacitance, and a second transistor which has a control electrode thereof connected to the own-stage scanning line and, at the same time, a first electrode thereof connected to another end of the integrated capacitance, and a second electrode thereof connected to one of the plurality of X output lines.

(11) In the constitution (10), to the initializing control line, a photo detection circuit initializing voltage having a voltage change polarity opposite to a corresponding polarity of a scanning voltage is applied to the next-stage scanning line out of the plurality of scanning lines is applied.

(12) In any one of constitutions (9) to (11), the display device includes an X output circuit to which the respective output lines of the plurality of X output lines are connected, the X output line includes an initializing circuit which applies an initializing voltage for initializing the X output lines to the respective X output lines when a non-selective scanning voltage is applied to the respective scanning lines of the plurality of scanning lines, and the display device simultaneously performs writing of a display signal to the pixels corresponding to one row which are connected to the scanning lines to which the scanning voltage is applied out of the plurality of scanning lines and the detection of an output of the photo detection circuit corresponding to one row which includes the first transistor which is connected to the scanning line to which the scanning voltage is applied.

(13) In any one of constitutions (1) to (12), the photo sensor is constituted of a diode.

(14) In the constitution (13), the photo sensor is constituted of a thin film transistor adopting the diode connection.

(15) In any one of constitutions (4), (6) and (12), the X output circuit is arranged around the display part.

(16) In any one of constitutions (1) to (15), the photo detection circuit is provided for each pixel out of the plurality of pixels.

(17) In the constitution (16), the display device is a liquid crystal display device, wherein each pixel out of the plurality of pixels includes a first sub pixel having a first-color color filter, a second sub pixel having a second-color color filter which differs in color from the first-color, and a third sub pixel having a third-color color filter which differs in color from the first-color and second-color, and the color filters are not arranged on a region where the photo detection circuit is formed.

To briefly explain the advantageous effects obtained by the typical inventions among the inventions disclosed in this specification, they are as follows.

According to the display device of the present invention which incorporates the touch panel function therein, it is possible to reduce the number of elements which constitutes the photo sensor circuit and it is also possible to detect the accurate input coordinate position without requiring the particular coordinate arithmetic circuit.

Hereinafter, an embodiment in which the present invention is applied to the liquid crystal display device is explained in detail in conjunction with attached drawings.

Here, in all drawings for explaining the embodiments, parts having identical functions are given same numerals and their repeated explanation is omitted.

DETAILED DESCRIPTION OF THE INVENTION

Embodiment 1

Figure 1:
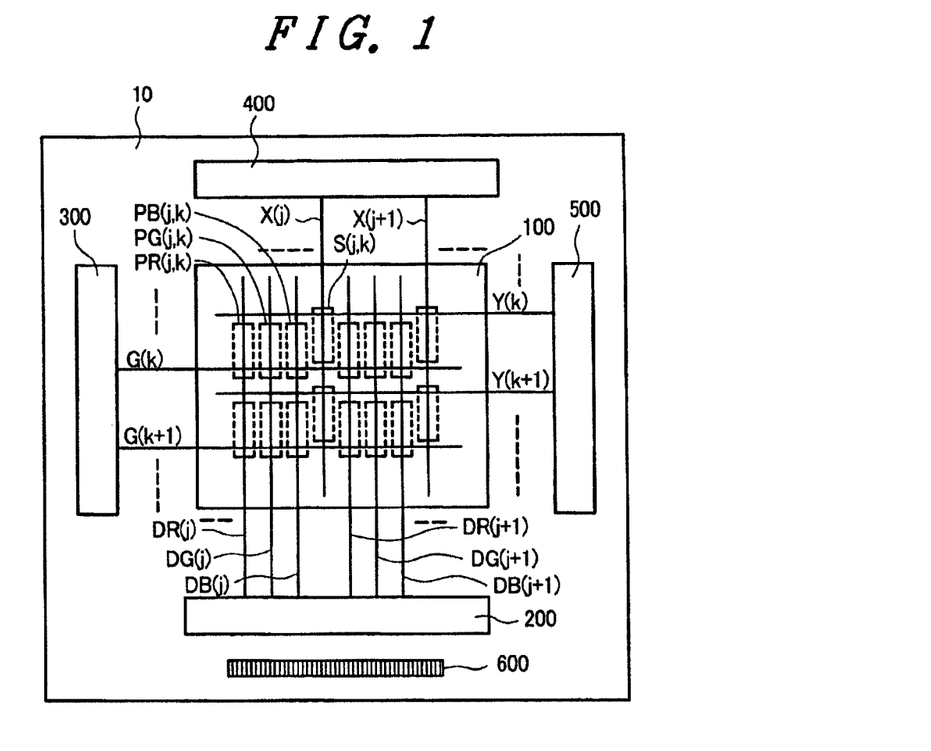
FIG. 1 is a block diagram showing the constitution of a liquid crystal display panel of a liquid crystal display device according to an embodiment 1 of the present invention.

FIG. 1 is a block diagram showing the constitution of a liquid crystal display panel of a liquid crystal display device according to an embodiment 1 of the present invention.

The liquid crystal display panel of the embodiment incorporates a photo sensor circuit (a photo detection circuit) therein.

The liquid crystal display panel 10 of this embodiment includes a display part 100 and is constituted of a drain drive circuit 200, a gate drive circuit 300, an X output circuit 400, a Y output circuit 500, and terminals 600.

The display part 100 includes sub pixels PR(j,k), PG(j,k), PB(j,k) having color filters corresponding to three primary colors respectively and photo sensor circuits S(j,k) which are arranged in a matrix array. One pixel is constituted of three sub pixels (PR(j,k), PG(j,k), PB(j,k)).

A gate line G(k) which is outputted from the gate drive circuit 300 and drain lines (DR(j), DG(j), DB(j)) which are outputted from the drain drive circuit 200 are connected to the sub pixels (PR(j,k), PG(j,k), PB(j,k)), while an X output line X(j) from the X output circuit 400 and a Y output line Y(k) from the Y output circuit 500 are connected to the photo sensor circuit S(j,k).

Figure 2:
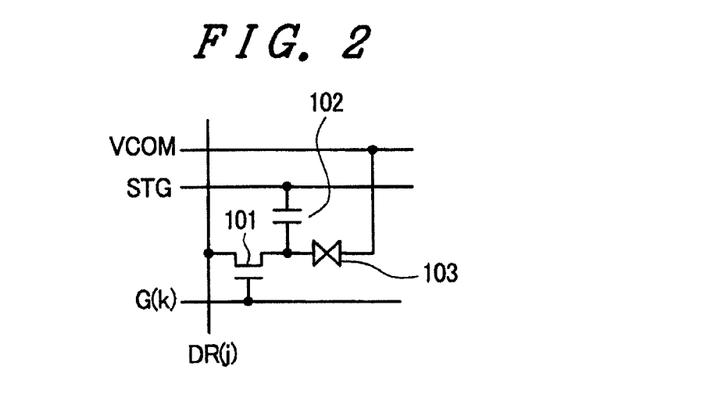
FIG. 2 is a circuit diagram showing an equivalent circuit of a sub pixel PR(j,k) shown in FIG. 1.

FIG. 2 is a circuit diagram showing an equivalent circuit of a sub pixel PR(j,k) shown in FIG. 1.

The sub pixel PR(j,k) is constituted of a pixel transistor (hereinafter, referred to as pixel TFT) 101 which is constituted of a thin film transistor (hereinafter, referred to as TFT), a holding capacitance 102 and a liquid crystal capacitance 103.

The pixel TFT 101 has a gate thereof connected to the gate line G(k), a drain thereof connected to the drain line DR(j), and a source thereof connected to the holding capacitance 102 and the liquid crystal capacitance 103.

Another end of the holding capacitance 102 is connected to a storage line STG, while another end of the liquid crystal capacitance 103 is connected to a common electrode VCOM.

Figure 3:
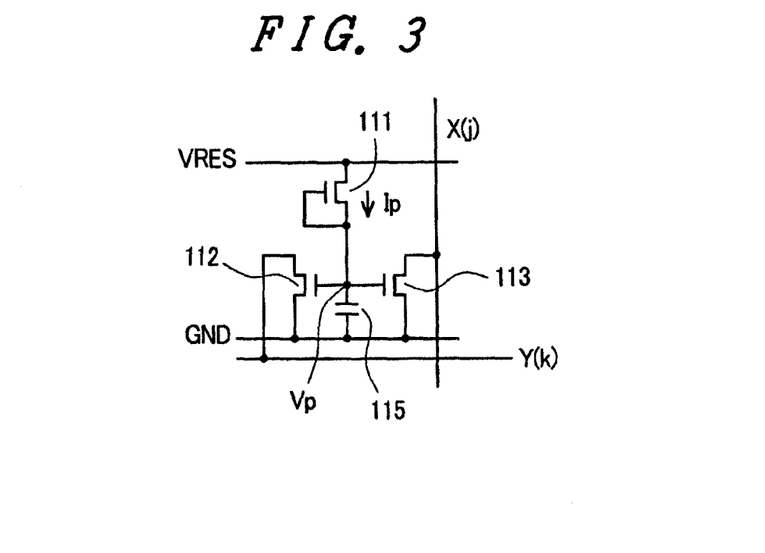
FIG. 3 is a circuit diagram showing an equivalent circuit of one example of a photo sensor circuit S(j,k) shown in FIG. 1.

FIG. 3 is a circuit diagram showing an equivalent circuit of one example of the photo sensor circuit S(j,k) shown in FIG. 1.

The photo sensor circuit S(j,k) is constituted of a photo diode (photo sensor) 111 which is formed of a TFT in diode connection, TFTs (112, 113) having sources thereof grounded, and an integral capacitance 115.

The photo diode 111 is connected between a reset line VRES and the integral capacitance 115. The reset line VRES is connected to the Y output circuit 500, for example.

Drains of the TFTs (112, 113) are respectively connected to the Y output line Y(k), the X output line X(j), while both of gates of the TFTs (112, 113) are connected to the integral capacitance 115.

Figure 4:
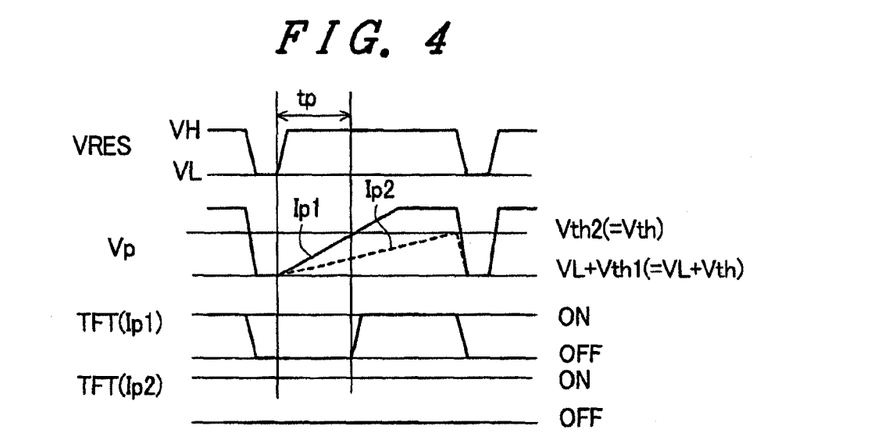
FIG. 4 is a timing chart for explaining an operation of the photo sensor circuit S(j,k) shown in FIG. 1.

FIG. 4 is a timing chart for explaining an operation of the photo sensor circuit S(j,k) shown in FIG. 1.

As shown in FIG. 4, a voltage of the reset line VRES is a binary signal having a high-level voltage of VH and a low-level voltage of VL.

A voltage Vp of the integral capacitance 115 becomes (VL+Vth1 (a threshold value voltage of the photo diode 111)) since the photo diode assumes a forward bias when the voltage of the reset line VRES is VL.

Further, when the voltage of the reset line VRES is VH, the photo diode 111 assumes a reverse bias and hence, an optical current Ip which corresponds to intensity of the radiated light flows in the photo diode 111.

Since the optical current Ip is integrated by the integral capacitance 115, as shown in FIG. 4, the voltage Vp is elevated along with a lapse of time. A gradient of this elevation of the voltage Vp is proportional to the optical current Ip. In FIG. 4, Ip1 indicates a case in which the optical current Ip is large (the optical intensity is strong), while Ip2 indicates a case in which the optical current Ip is small (the optical intensity is weak).

The TFTs (112, 113) which have gates thereof connected to the integral capacitance 115 assume an OFF state when the voltage Vp becomes Vp≤Vth2 (threshold value voltages of the TFTs (112, 113)), and assumes an ON state when the voltage Vp becomes Vp>Vth2.

Accordingly, as in the case of the TFT (Ip1) shown in FIG. 4, when the optical current Ip is large (Ip1), at a point of time that the voltage Vp exceeds the threshold value voltage Vth2, the TFTs (112, 113) are changed from an OFF state to an ON state, while as in the case of the TFT (Ip2) shown in FIG. 4, when the optical current Ip is small (Ip2), the TFTs (112, 113) are held at the OFF state.

Here, since the photo diode 111 and the TFTs (112, 113) are formed on the same TFT manufacturing steps, the threshold value voltage Vth1 of the photo diode 111 and the threshold value voltage Vth2 of the TFTs (112, 113) are substantially equal and hence, it is assumed that the relationship Vth=Vth1=Vth2 is established.

Here, the optical current Ip and time difference tp from a point of time that the voltage of the reset line VRES rises to a point of time that the voltage Vp exceeds the threshold value voltage Vth2 are expressed by a following formula, wherein the capacitance of the integrated capacitance 115 is indicated by Cp.

$$tp = Cp \times |VL|/Ip \qquad (1)$$

From this formula (1), the time difference tp is inversely proportional to the optical current, a coefficient of the time difference is determined based on the integrated capacitance Cp and the low-level voltage VL of the reset line VRES, and the threshold value voltage Vth2 of the TFTs (112, 113) is not included.

From the above, the photo sensor circuit shown in FIG. 3 does not depend on the threshold value voltage Vth2 of the TFTs (112, 113) and hence, it is possible to detect the optical current (Ip) in a stable manner.

Figure 5:
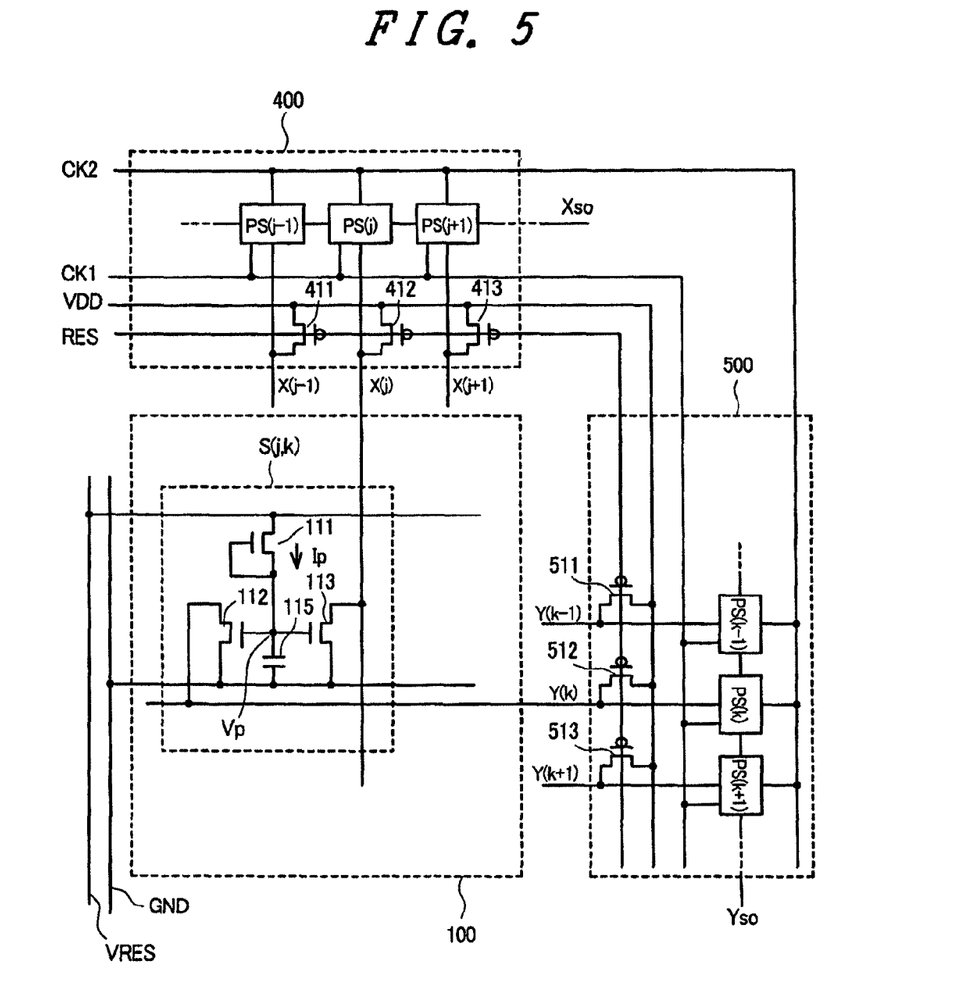
FIG. 5 is a circuit diagram showing the constitution of circuits including the photo sensor circuit S(j,k) and a peripheral circuit thereof according to the embodiment 1 of the present invention.

FIG. 5 is a circuit diagram showing the constitution of circuits including the photo sensor circuit S(j,k) and a peripheral circuit thereof according to the embodiment. The connection of the photo sensor circuit S(j,k), the X output circuit 400 and the Y output circuit 500 is exactly performed as shown in FIG. 1.

A power source line which supplies a ground voltage GND to the photo sensor circuit S(j,k) and the reset line VRES are connected in common outside the display part 100.

The X output circuit 400 is constituted of parallel input/series output circuits (hereinafter simply referred to as a PS circuit) PS(j) and TFTs (411 to 413) for initializing the X output lines X(j). The TFTs (411 to 413) are p-type thin film transistors. The initializing TFTs (411 to 413) constitute an initializing circuit.

Clocks (CK1, CK2) and the X output lines X(j) are inputted to the PS circuits PS(j).

Further, the PS circuit PS(j) receives inputting of signals from the preceding PS circuits PS(j) and outputs the signals to the next PS circuit PS(j) (Here, the name of signals are not described in FIG. 5).

The initializing TFTs (411 to 413) have drains to which the power source voltage VDD is applied, have gates to which the reset signal RES is applied and, at the same time, has sources thereof respectively connected to the X output lines (X(j−1), X(j) and X(j+1)). An output Xso of the X output circuit 400 constitutes the output of the PS circuit of a final stage.

The Y output circuit 500 is equivalent to the X output circuit 400 and is constituted of the PS circuits PS(k) and TFTs (511 to 513) for initialing the Y output lines Y(k). Clocks (CK1, CK2) and the Y output lines Y(k) are inputted to the PS circuit PS(k).

The initializing TFTs (511 to 513) have drains to which the power source voltage VDD is applied, have gates to which the reset signal RES is applied and, at the same time, has sources thereof respectively connected to the Y output lines (Y(k−1), Y(k) and Y(k+1)). An output Yso of the Y output circuit 500 constitutes the output of the PS circuit of a final stage.

Figure 6:
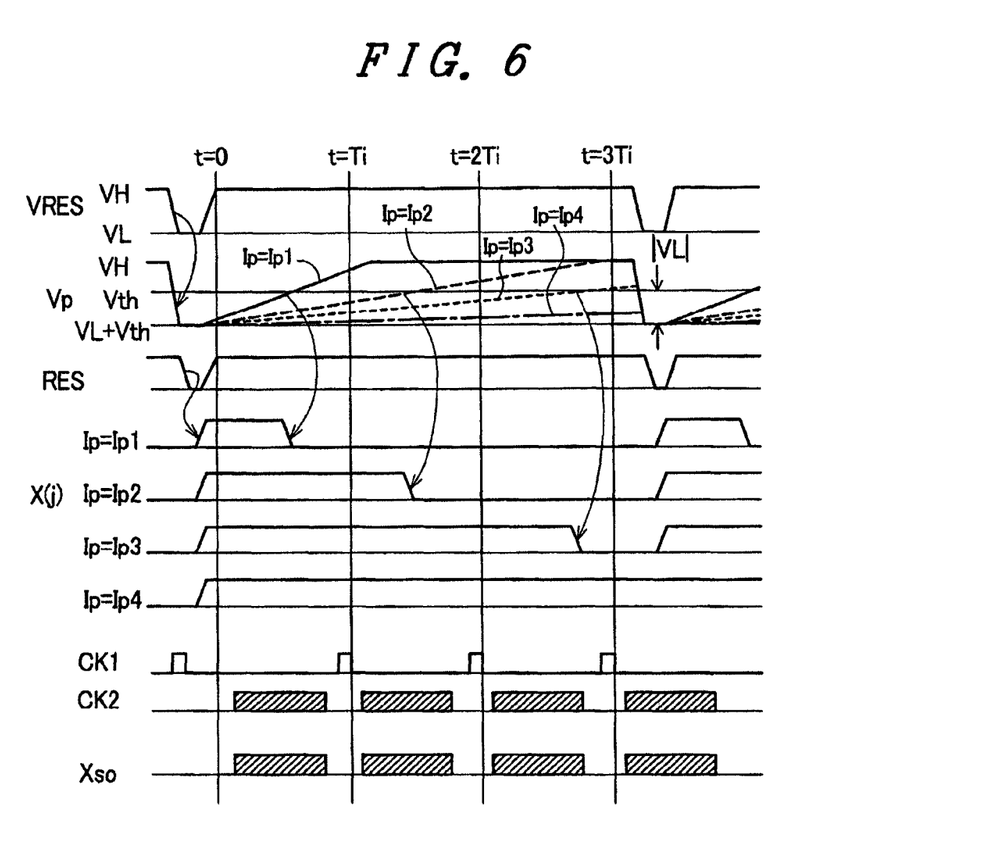
FIG. 6 is a timing chart for explaining an operation of the photo sensor circuit S(j,k) and the peripheral circuit thereof shown in FIG. 5.

FIG. 6 is a timing chart for explaining an operation of the photo sensor circuit S(j,k) and the peripheral circuit thereof shown in FIG. 5.

Timings of the voltage of the reset line VRES and VP are equal to the corresponding timings in FIG. 4. The optical current Ip is indicated under 4 conditions of Ip1, Ip2, Ip3, Ip4.

A reset signal RES is a signal for initializing the X output lines X(j) and the Y output lines Y(k), X(j) indicates a voltage of the X output lines X(j), (CK1, CK2) indicate control signals of the SP circuit, Xso indicates an output of the X X output circuit 400. The voltage Vp has the same waveform of the voltage Vp shown in FIG. 4.

When the reset signal RES assumes a Low level (hereinafter referred to as L level), the TFTs (411-413, 511-513) assume an ON state and hence, the X output lines and the Y output lines are initialized to the power source voltage VDD.

The operation of the output lines is shown by taking the X output lines X(j) as an example. The operation of the output lines is shown with respect to cases when Ip is set to Ip1, Ip2, Ip3 and Ip4 respectively. The Ip order relationship is set to Ip1>Ip2>Ip3>Ip4.

The voltage X(j) of the X output lines is initialized to a High level (hereinafter referred to as H level) at timing that the reset signal RES assumes the L level.

Thereafter, when the voltage Vp exceeds the threshold value voltage Vth of the TFT 113, the output TFT 113 of the photo sensor circuit part assumes an ON state and the voltage X(j) of the X output lines assumes an L level.

A point of time t at which the voltage X(j) of the X output lines is changed over from the H level to the L level is changed in response to the value of the optical current Ip, wherein the point of time t becomes 0<t<Ti when the Ip is Ip1, Ti<t<2Ti when Ip is Ip2, 2Ti<t<3Ti when Ip is Ip3, and is not changed over from the H level to the L level when Ip is Ip4.

The clock CK1 is a clock (data latch clock) for acquiring data on the X output lines X(j) and the Y output lines Y(k) into the PS circuits PS(j), PS circuits PS(k). FIG. 6 shows an example in which the clock CK1 is inputted at timings of t=Ti, 2Ti, 3Ti.

Figure 17:
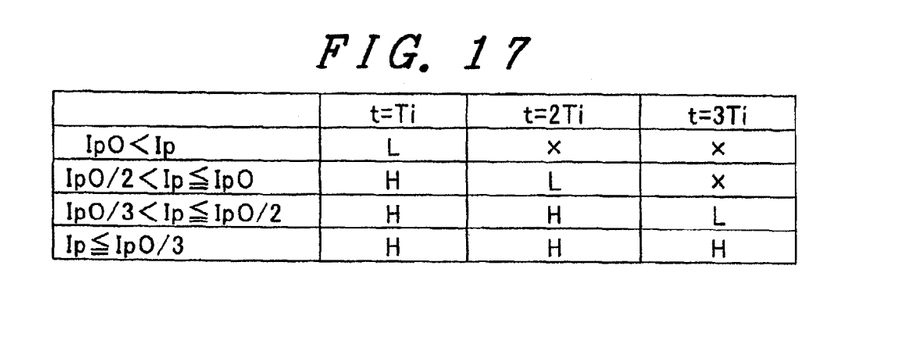
FIG. 17 is a table showing the relationship between an optical current Ip and voltages of an X output line in respective times t.

The relationship among the optical current Ip, the time difference tp and the capacitance Cp is expressed by the previously-mentioned formula (1) and hence, the optical current Ip and the voltages of the X output lines at respective points of time t assume values described in a table shown in FIG. 17. Here, Ip0=Cp×|VL|/Ti In this manner, it is possible to detect the optical current based on the state of the X output lines at the respective points of time. In this embodiment, by setting the acquisition time three times, it is possible to detect optical currents of four gray scales. In this manner, by performing the detection of voltage of the X output lines (or Y output lines) plural times (N times) during one detection period, it is possible to detect the optical current in multiple gray scales (N+1 gray scales). Here, when the voltage detection is not performed plural time, that is, when N=1, the detection of two-gray-scales (ON and OFF) is performed.

The clock CK2 is a data shift clock of the PS circuit. In response to this clock CK2, data on the PS circuits PS(j), PS(k) which is acquired at the timing of the clock CK1 is shifted and the data is outputted as outputs Xso, Yso of the X, Y output circuits respectively.

FIG. 6 shows the timing of the output Xso of the X output circuit 400. The output Xso is outputted in synchronism with the output timing of the clock CK2. By observing the output Xso three times, it is possible to know the timings at which the X output lines X(j) are changed thus enabling the detection of four gray scales.

Figure 8:
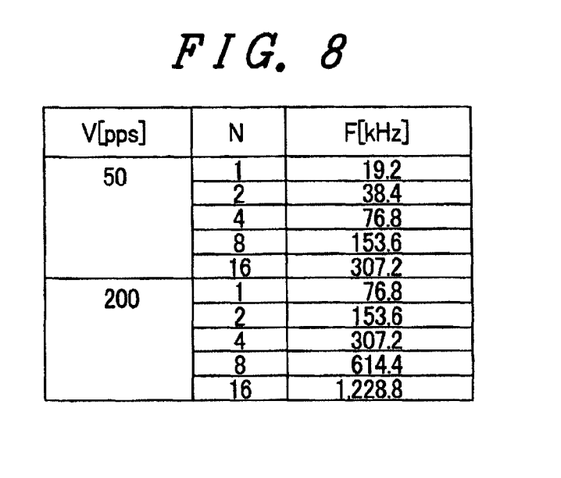
FIG. 8 is a graph showing one example of the relationship among frequency of a clock CK2, the number of gray scales of an optical current Ip and the detection speed according to the embodiment 1 of the present invention.

The frequency of the clock CK2 is determined based on the number of gray scales and the detection speed of the optical current Ip, wherein the higher the number of gray scales or the detection speed, the frequency is increased. This relationship is shown in FIG. 8. Here, FIG. 8 shows an example in which the number of photo sensors circuit is 240×320. Symbol V indicates the detection speed and a unit of the detection speed is pps (pixel per second). Symbol N indicates the number of detection during one detection period and the number of gray scales is set to −1. Symbol F indicates the output circuit scanning frequency and is a frequency of the clock CK. A unit of the frequency is kHz.

Figure 7:
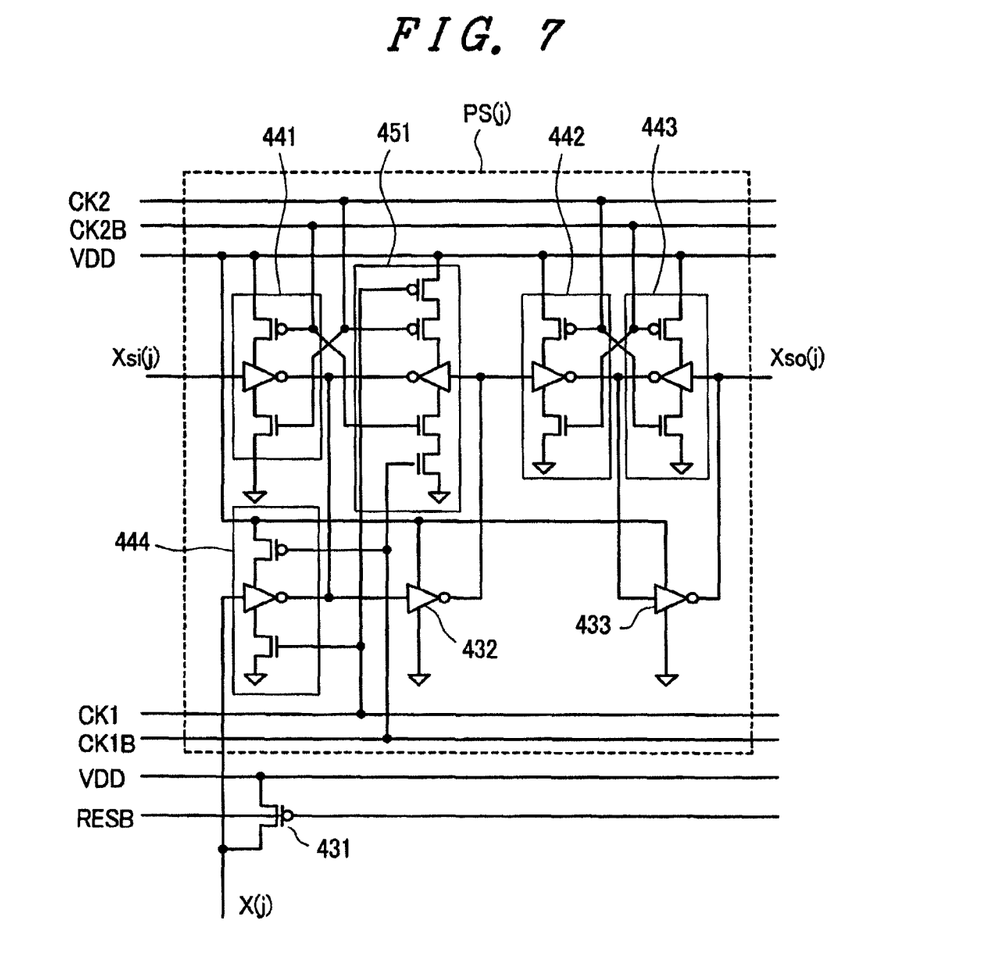
FIG. 7 is a circuit diagram showing one example of a unit circuit which constitutes an X output circuit and a Y output circuit shown in FIG. 1.

FIG. 7 is a circuit diagram showing one example of a unit circuit which constitutes the X output circuit 400 and the Y output circuit 500 shown in FIG. 1.

In this unit circuit, the PS circuit PS(j) is constituted of first clocked gates (also referred to as clocked inverters) (441 to 444), a second clocked gate 451 and inverters (432, 433). A TFT 431 is an initializing TFT and corresponds to the TFT 412 which is explained in conjunction with FIG. 5.

A clock CK1B is an inverted signal of the clock CK1 and a clock CK2B is an inverted signal of the clock CK2.

The clock CK1 and the clock CK1B are connected to the first clocked gate 444 and the second clocked gate 451, while the clock CK2 and the clock CK2B are connected to the first clocked gate (441 to 443) and the second clocked gate 451.

This unit circuit includes first to third latch circuits. The first latch circuit is constituted of the clocked gates (444, 451) and the inverter 432, the second latch circuit is constituted of the clocked gates (441, 451) and the inverter 432, and the third latch circuit is constituted of the clocked gates (442, 443) and the inverter 433.

The first latch circuit acquires and holds a logic level of the X-output line X(j) at timings of the clocks (CK1, CK1B).

The second latch circuit and the third latch circuit are operated at timings of the clock CK2 and the clock CK2B, and output data which is acquired by the first latch circuit to the output Xso(j) of for a next stage and, at the same time, acquire a data from the input Xsi(j) from a preceding stage.

Figure 15:
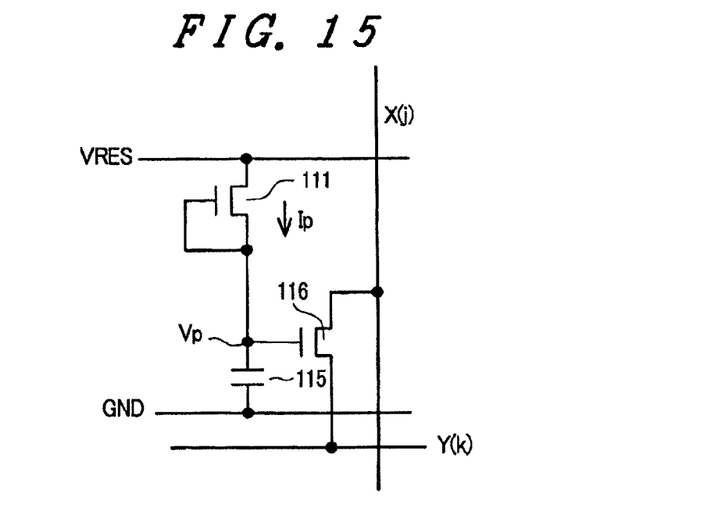
FIG. 15 is circuit diagram showing an equivalent circuit of another example of the photo sensor circuit S(j,k) shown in FIG. 1.

FIG. 15 is a circuit diagram showing an equivalent circuit of another example of the photo sensor circuit S(j,k) shown in FIG. 1.

The photo sensor circuit S(j,k) shown in FIG. 15 differs from the photo sensor circuit S(j,k) shown in FIG. 3 with respect to a point that the TFT 112 and the TFT 113 are removed and a TFT 116 is added.

The added TFT 116 has, a gate to which a voltage Vp of the integral capacitance 115 is applied, has a drain electrode thereof connected to the X output line X(j), and has a source electrode thereof connected to the Y output line Y(k).

Figure 16:
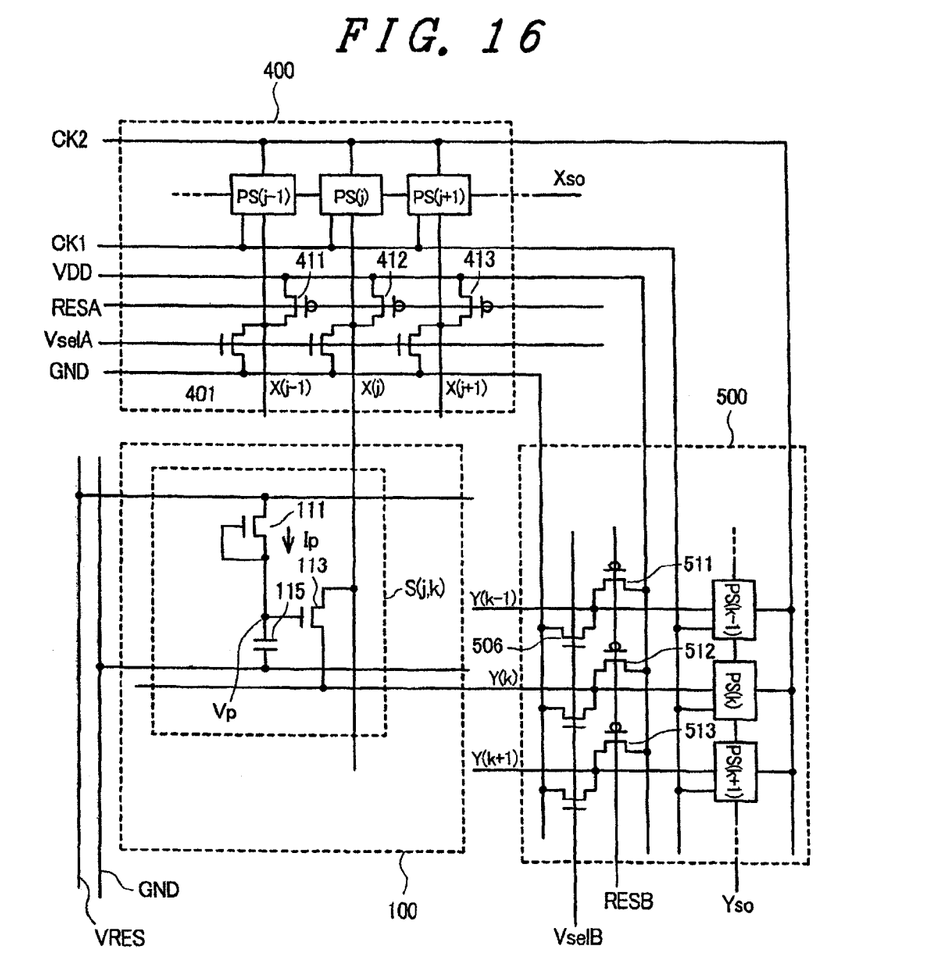
FIG. 16 is a circuit diagram shown the constitution of circuits including the photo sensor circuit S(j,k) and the peripheral circuits thereof shown in FIG. 15.

FIG. 16 is a circuit diagram showing the constitution of the circuit including the photo sensor circuit S(j,k) shown in FIG. 15 and peripheral circuits of the photo sensor circuit S(j,k).

In the example shown in FIG. 15, an operation of the X output circuit and an operation of the Y output circuit are executed by time-division processing. That is, in detecting the X output line X(j), a selective voltage VselA shown in FIG. 16 is set to an L level and a selective voltage VselB to an H level so as to turn off the TFT 401 and to turn on the TFT 501 thus applying a ground voltage GND to the Y output line Y(k). Then, the X output line X(j) is initialized in response to a reset signal RESA thus allowing the X output circuit to operate in the same manner as the example shown in FIG. 3.

On the other hand, in detecting the Y output line Y(k), the selective voltage VselA shown in FIG. 16 is set to an H level and the selective voltage VselB is set to an L level so as to turn on the TFT 401 and to turn off the TFT 501 thus applying a ground voltage GND to the X output line X(j). Then, the Y output line Y(k) is initialized in response to the reset signal RESB thus allowing the Y output circuit to operate in the same manner as the example shown in FIG. 3.

In this manner, coordinates of X and Y are detected. In the example shown in FIG. 15, the photo sensor circuit S(j,k) is constituted of two TFTs and hence, it is possible to obtain an advantageous effect that the transmissivity of the pixel is improved.

Figure 13:
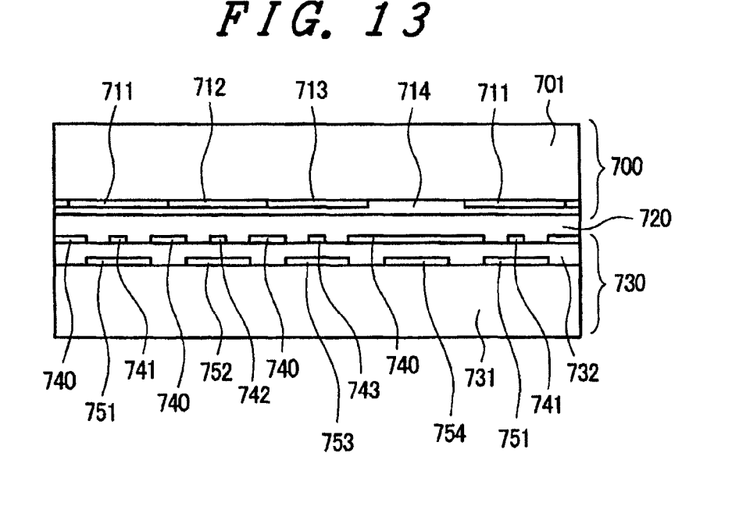
FIG. 13 is a cross-sectional view showing the cross-sectional structure of a display part shown in FIG. 1.

FIG. 13 is a cross-sectional view which shows the cross-sectional structure of the display part 100 shown in FIG. 1. FIG. 13 shows an example in which the present invention is applied to a normally-black (NB) lateral-electric-field-mode liquid crystal display panel.

As shown in FIG. 13, the display part 100 shown in FIG. 1 is configured such that a liquid crystal 720 is sandwiched between a TFT substrate 730 and a counter substrate 700.

The TFT substrate 730 is configured such that respective sub pixel circuits (751 to 753) of R, G, B and a photo sensor circuit 754 are formed on a glass substrate 731, and a common electrode 740 and respective pixel electrodes (741 to 743) of R, G, B are formed over the sub pixel circuits (751 to 753) and the photo sensor circuit 754 by way of an insulating layer 732.

On the other hand, the counter substrate 700 is configured such that respective color filters (711 to 713) of R, G, B are formed below the glass substrate 701, and the respective color filters are covered with an overcoat film 714.

In such a constitution, over the respective pixel electrodes (741 to 743) of R, G, B, the color filters (711 to 713) having colors which correspond to colors of the respective pixel electrodes (741 to 743) are arranged. Further, the photo sensor circuit 754 is shielded by being covered with the common electrode 740 from above. Further, at positions which correspond to the photo sensor circuit 754, the color filters are not arranged.

Figure 14:
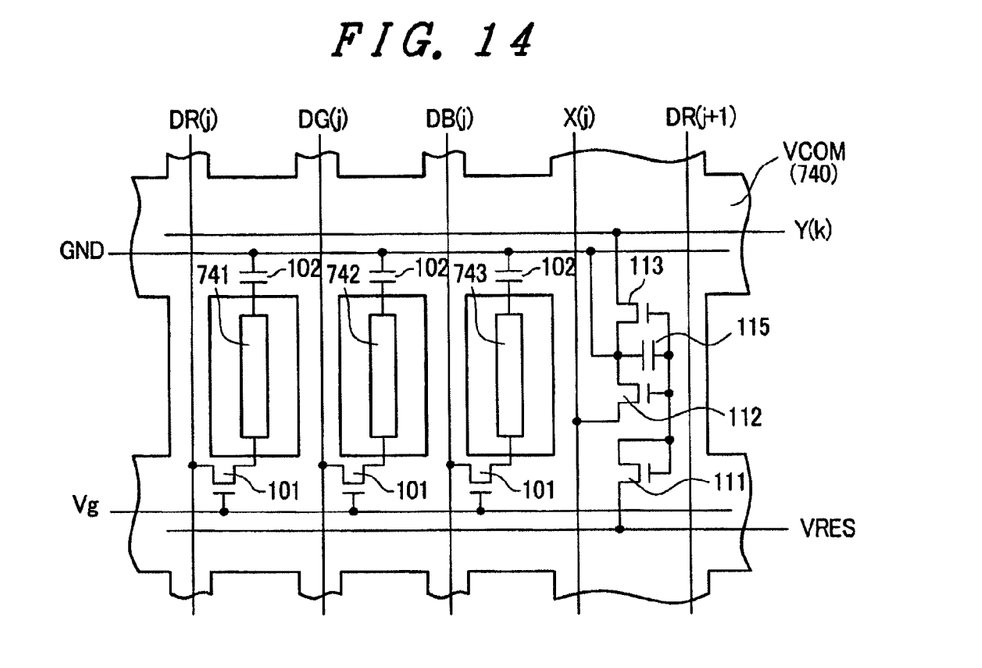
FIG. 14 is plan view of a TFT substrate shown in FIG. 13.

FIG. 14 is a plan view of the TFT substrate 730 shown in FIG. 13, and also is a view which shows the pixel electrodes (741 to 743) and the common electrode 740 which are formed on the TFT substrate 730.

Each sub pixel circuit (751 to 753) is constituted of the pixel TFT 101 and the holding capacitance 102 while the photo sensor circuit 754 is constituted of the TFTs (111 to 113) and the integral capacitance 115.

The common electrode 740 forms opening portions therein at positions corresponding to the respective sub pixel circuits (751 to 753), and is arranged like a mesh so as to cover the whole display region. Here, the pixel electrodes (741 to 743) are arranged in the inside of the opening portions.

In the constitution formed of the pixel electrodes (741 to 743) and the common electrode 740, the liquid crystal 720 is driven by a lateral electric field which is generated due to the voltages of the pixel electrodes (741 to 743) and the voltage of the common electrode 740 thus controlling light which passes through the respective sub pixel circuits.

In this embodiment, the photo sensor circuit 754 is covered with the common electrode 740. Accordingly, the lateral electric field is not generated in the liquid crystal arranged over the photo sensor circuit and hence, the liquid crystal display device performs a black display. On the other hand, light form the outside enters without passing through the color filter and hence, it is possible to suppress the attenuation of light.

Embodiment 2

A liquid crystal display panel of a liquid crystal display device according to an embodiment 2 of the present invention also incorporates a photo sensor circuit therein.

Figure 9:
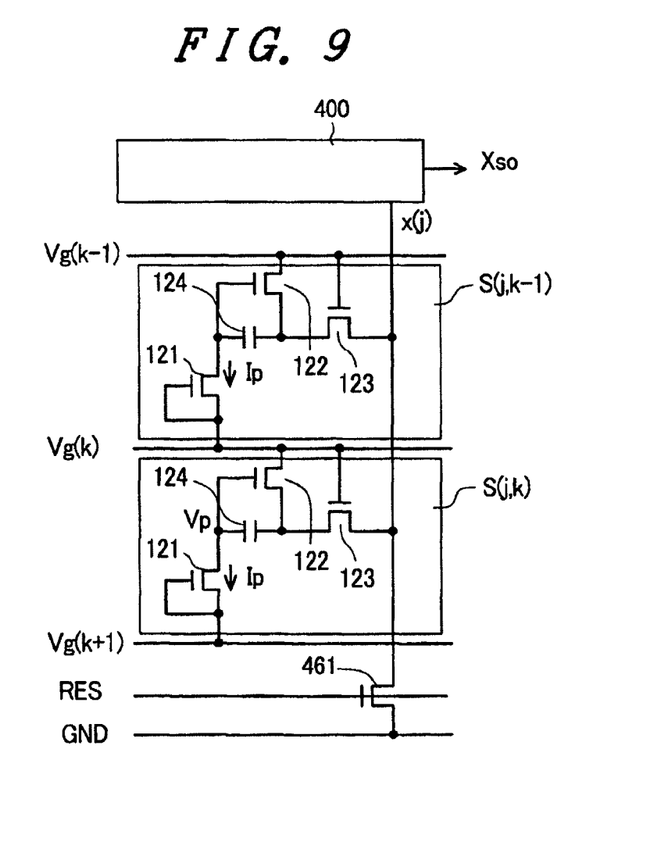
FIG. 9 is a circuit diagram showing an equivalent circuit of one example of a photo sensor circuit S(j,k) according to an embodiment 2 of the present invention.

FIG. 9 is a circuit diagram showing an equivalent circuit of an example of a photo sensor circuit S(j,k) according to the embodiment.

As shown in the drawings, the photo sensor circuit S(j,k) according to this embodiment is constituted of a photodiode 121, TFTs (122, 123) and a bootstrap capacitance (hereinafter referred to as BS capacitance) 124.

The photo diode 121 has one end thereof connected to a gate line Vg(k+1) of a next stage and has another end connected to a gate of the TFT 122. The BS capacitance is connected between a gate and a drain of the TFT 122.

Further, a source of the TFT 122 and a gate of the TFT 123 are connected to the own-row gate line Vg(k), a source of the TFT 123 is connected to the drain of the TFT 122, and a drain of the TFT 123 is connected to X output line X(j). The X output line X(j) is connected to the output circuit 400 and the initializing TFT 461. Here, the initializing TFT 461 may also form a constitutional element of the X output circuit 400. The X output circuit 400 may be realized with the constitution in the substantially same manner as the X output circuit 400 explained in conjunction with the embodiment 1. However, this embodiment shows an example of the detection of 2 gray-scale (ON or OFF) detection.

Figure 10:
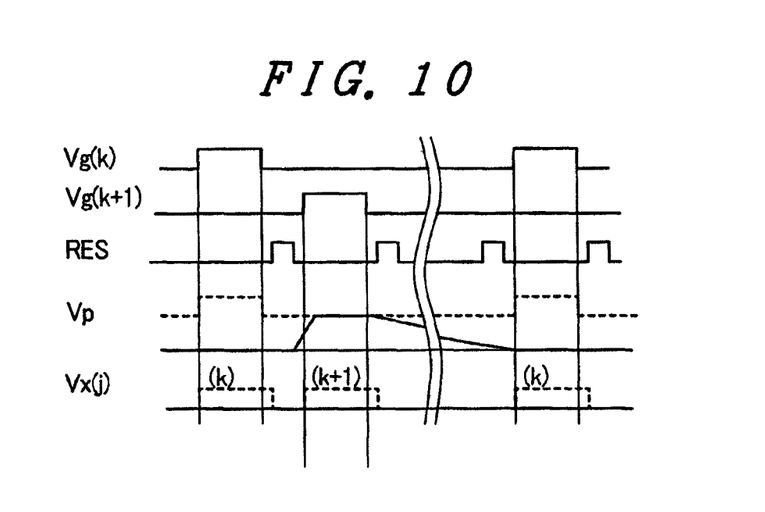
FIG. 10 is a timing chart for explaining an operation of the photo sensor circuit S(j,k) shown in FIG. 9.

FIG. 10 is a timing chart for explaining an operation of the photo sensor circuit S(j,k) shown in FIG. 9.

Voltages (Vg(k), Vg(k+1)) of the respective gate lines have periods in which these voltages assume the L level, wherein during the periods, the reset signal RES is set to the H level and hence, the initializing TFT 461 is turned on whereby the X output lines X(j) are initialized to the L level.

The voltage Vp and the voltage VX(j) of the X output lines when Ip=0 are indicated by a broken line, while the voltage Vp and the voltage VX(j) of the X output lines when Ip is large are indicated by a solid line.

When the voltage Vg(k+1) of the gate line assumes the H level, the photo diode 121 assumes the forward bias and hence, the voltage of Vp is elevated. Here, since the TFT 122 is turned on, the drain of the TFT 122 assumes the L level and the BS capacitance 124 is initialized with the voltage of Vp. In this case, the voltage Vp assumes a voltage which exceeds the threshold value voltage Vth.

Next, when the voltage Vg(k+1) of the gate line assumes the L level, the photo diode 121 assumes the reverse bias and hence, the optical current Ip flows corresponding to the light radiation quantity.

The voltage Vp holds the voltage when the optical current Ip is zero and when the optical current Ip is increased, the voltage is decreased as shown in FIG. 10.

The TFT 122 assumes the On state when the voltage of Vp is equal to or more than the threshold value voltage Vth (Vp Vth) and assumes the OFF state when the voltage of Vp is less than the threshold value voltage Vth (Vp<Vth).

When the voltage Vg(k) of the gate line assumes the H level, the TFT 123 is turned on and hence, the state of the X output lines X(j) is controlled based on the state of the TFT 122. That is, when the voltage Vp holds the voltage Vp which exceeds the threshold value voltage Vth, the TFT 122 is held on the ON state and hence, the voltage Vg(k) of the gate line is outputted to the X output lines X(j). When the voltage Vp is less than the threshold value voltage Vth, the TFT 122 is turned off and hence, the X output lines X(j) maintains the L level.

According to this embodiment, it is possible to synchronously perform the writing of the display signal to the pixels of one preceding row which are connected to the scanning line to which the scanning voltage is applied out of the plurality of scanning lines and the detection of the output of the photo sensor circuit of one row which possesses the TFTs 122, 123 which are connected to the scanning line to which the scanning voltage is applied. Further, it is no more necessary to provide the Y output circuit 500 which is necessary in the embodiment 1.

Embodiment 3

A liquid crystal display panel of a liquid crystal display device according to the embodiment 3 of the present invention also incorporates a photo sensor circuit therein.

Figure 11:
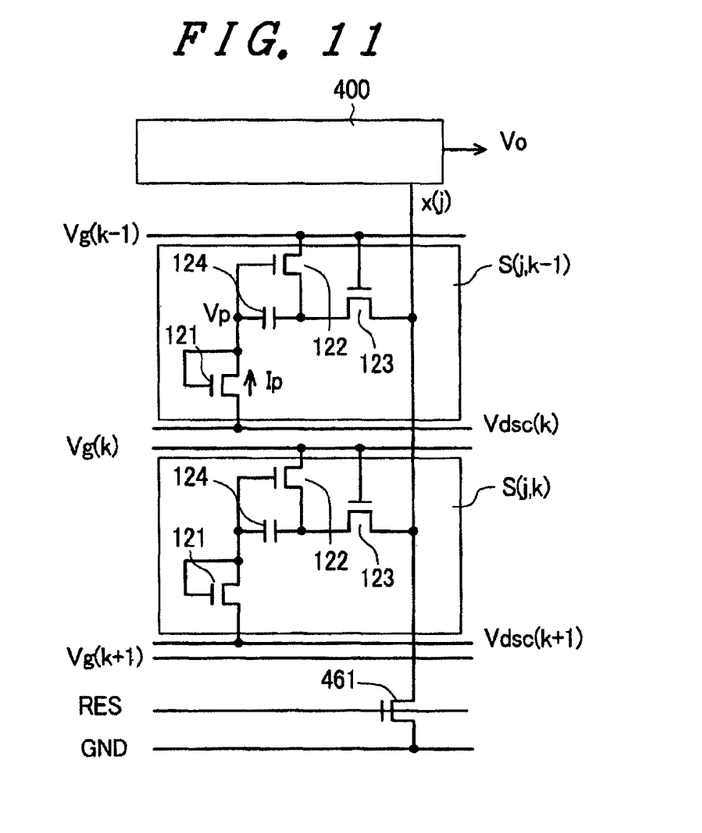
FIG. 11 is a circuit diagram showing an equivalent circuit of one example of a photo sensor circuit S(j,k) according to an embodiment 3 of the present invention.

FIG. 11 is a circuit diagram showing an equivalent circuit of one example of the photo sensor circuit S(j,k) of this embodiment.

The photo sensor circuit S(j,k) of this embodiment differs from the above-mentioned photo sensor circuit S(j,k) of the embodiment 2 with respect to a point that a PN junction of the photo diode 121 is inverted and a point that one end of the photo diode 121 is connected to an initializing control line Vdsc(k+1).

Figure 12:
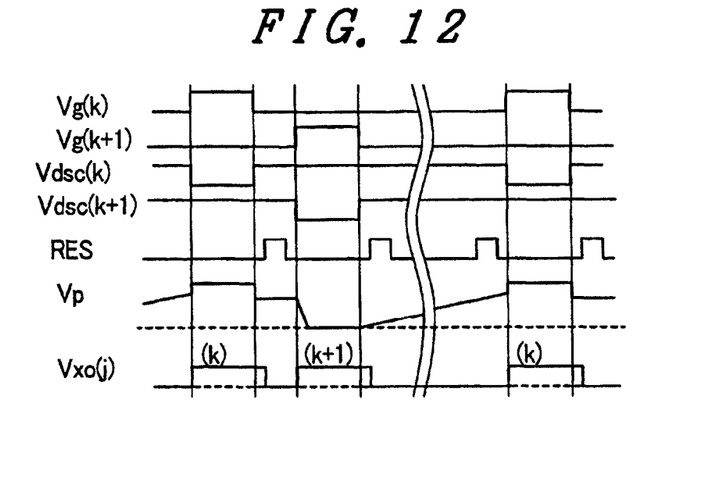
FIG. 12 is a timing chart for explaining an operation of the photo sensor circuit S(j,k) shown in FIG. 11.

FIG. 12 is a timing chart for explaining the operation of the photo sensor circuit S(j,k) shown in FIG. 11.

The voltage Vdsc(k+1) of the initializing control line is a signal which has a phase opposite to a phase of the voltage Vg(k+1) of the gate line, wherein when the voltage Vdsc(k+1) is at the L level, the photo diode 121 assumes the normal bias and Vp is initialized to a voltage at the L level.

Thereafter, when the voltage Vdsc(k+1) of the initializing control line assumes the H level, the photo diode 121 assumes the reverse bias and hence, the optical current Ip flows into the BS capacitance 124 corresponding to a light radiation quantity.

Accordingly, the voltage Vp holds the voltage when the optical current Ip is zero and elevates the voltage when the optical current Ip is increased as shown in the drawing.

The operation of the TFTs (122, 123) is equal to the operation explained in conjunction with FIG. 10 and hence, when the voltage Vp exceeds the threshold value voltage Vth, the TFT 122 is turned on and the voltage of Vg(k) is outputted to the X output lines X(j). When the voltage Vp is less than the threshold value voltage Vth, the TFT 122 is turned off and the X output lines X(j) hold the L level. That is, in this embodiment, the voltage X(j) of the X output lines assumes the L level when the optical current is zero and assumes the H level when the optical current is large.

As has been explained above, according to the present invention, the optical detection means is constituted of the photo sensor circuit, the integral capacitance, and the comparator which is constituted of the TFT with the grounded source and hence, it is possible to reduce the number of elements which constitute the photo sensor circuit. Accordingly, it is possible to reduce an occupying area of the photo sensor circuit and hence, the numerical aperture of the display part can be increased.

The outputs of the optical detection means are connected in parallel in the X direction or in the Y direction, the inclusive OR of the optical detection outputs is acquired by the X,Y output lines, and the states of the X,Y output lines are read out by the X,Y output circuit and hence, the coordinates of the light radiation can be detected whereby the particular coordinates arithmetic means is no more necessary.

Further, the X,Y output circuits can be constituted of the logic circuit and hence, it is possible to realize the X,Y output circuits using the TFTs on the glass substrate.

In this manner, according to this embodiment, it is possible to integrally form the touch panel function with the display and hence, there is no possibility that the image quality of the display is damaged and hence, it is possible to provide the display device incorporating the touch panel function which can accurately detect the coordinates and, at the same time, requires no mechanism or structure for mounting the touch panel.

Here, in the above-mentioned respective embodiments, the explanation is made with respect to the embodiments which are applied to the liquid crystal display device. However, it is needless to say that the present invention is not limited to such embodiments and the present invention is applicable to an organic EL display device or the like.

Although the inventions made by the inventors of these inventions have been specifically explained in conjunction with the embodiments, it is needless to say that the present invention is not limited to these embodiments and various modifications are conceivable without departing from the gist of the present invention.

What is claimed is:

1. A display device comprising:
   a display part on which a plurality of pixels are arranged in a matrix array; and
   a plurality of photo detection circuits which are arranged in a matrix array in the inside of the display part, wherein the display part includes:
   a plurality of X output lines and a plurality of Y output lines which intersect the plurality of X output lines, and
   each photo detection circuit of the plurality of photo detection circuits includes:
   a photo sensor which converts an incident light into an optical current corresponding to intensity of the incident light;
   an integral capacitance which is connected in series to one end of the photo sensor and integrates the optical current which is converted by the photo sensor, and
   a comparator to which a voltage of the integral capacitance is inputted, said comparator comprising first and second transistors, each having a control electrode thereof connected to a node between the photo sensor and the integral capacitor, wherein each of the first and second transistors has a grounded source,
   wherein the first transistor has a drain coupled to one of the plurality of X output lines, and
   wherein the second transistor has a drain coupled to one of the plurality of Y output lines.

2. A display device according to claim 1, wherein the display device includes a reset line which is connected to another end of the photo sensor, and
   an integrated capacitance initializing voltage which initializes the integrated capacitance is applied to the reset line in an initial stage of a detection period for detecting a photo detection circuit to which light is radiated out of the plurality of photo detection circuits.

3. A display device according to claim 1, wherein said comparator of each of said photo detection circuits is configured to determine whether or not the voltage of the integral capacitance has exceeded a predetermined voltage threshold to thereby determine whether a portion of the display part where the photo detection circuit is located has been touched.

4. A display device comprising:
- a display part on which a plurality of pixels are arranged in a matrix array; and
- a plurality of photo detection circuits which are arranged in a matrix array in the inside of the display part, wherein
- each photo detection circuit of the plurality of photo detection circuits includes:
  - a photo sensor which converts an incident light into a optical current corresponding to intensity of the incident light;
  - an integral capacitance which integrates the optical current converted by the photo sensor; and
  - a comparator to which a voltage of the integral capacitance is inputted; and
- the comparator includes a transistor of an open drain output type with a grounded source,
- wherein said comparator of each of said photo detection circuits is configured to determine whether or not the voltage of the integral capacitance has exceeded a predetermined voltage threshold to thereby determine whether a portion of the display part where the photo detection circuit is located has been touched.

5. A display device according to claim 4, wherein an initializing voltage which initializes the integral capacitance is applied to the integral capacitance via a reset line.

6. A display device according to claim 5, wherein the X output circuit and the Y output circuit detect the optical currents in multiple gray scales by performing the detection of voltages of the X output lines and the Y output lines plural times during one detection period for detecting the photo detection circuit to which light is radiated out of the plurality of photo detection circuits.

7. A display device according to claims 4 or 5, wherein the photo sensor is constituted of a diode.

8. A display device according to claim 7, wherein the photo sensor is constituted of a thin film transistor adopting the diode connection.

9. A display device according to any one of claims 4 or 5, wherein the photo detection circuit is provided for each pixel out of the plurality of pixels.

10. A display device according to claim 9, wherein the display device is a liquid crystal display device, and
each pixel out of the plurality of pixels includes a first sub pixel having a first-color color filter, a second sub pixel having a second-color color filter which differs in color from the first-color, and a third sub pixel having a third-color color filter which differs in color from the first-color and second-color, and
the color filters are not arranged on a region where the photo detection circuit is formed.

11. A display device according to claim 4, wherein the comparator includes first and second transistors of an open drain output type with a grounded source.

12. A display device according to claim 11, wherein the first and second transistors have a control electrode thereof connected to a node between the photosensor and the integral capacitance.

* * * * *